Feb. 10, 1942. H. McC. WEIR 2,272,451
REGULATING MEANS
Filed Feb. 23, 1939
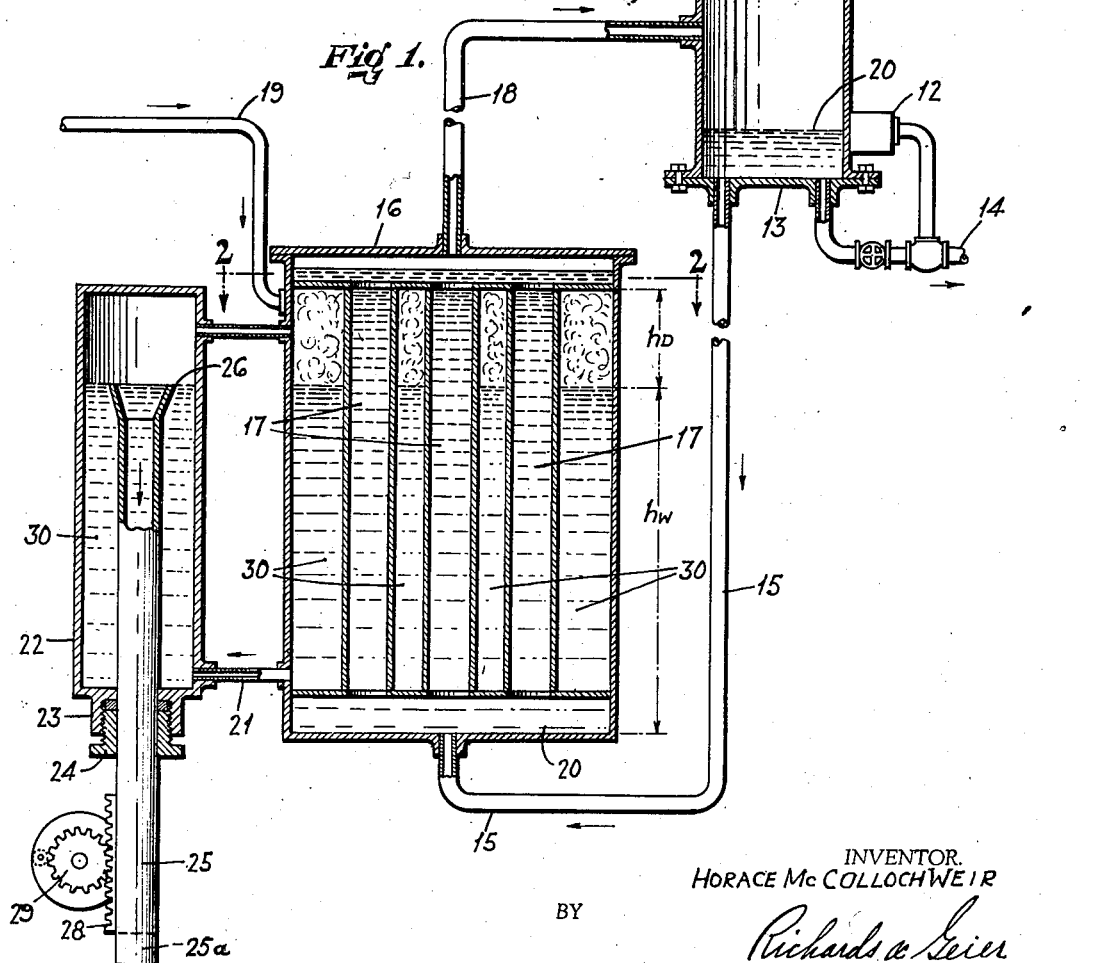
INVENTOR.
HORACE McCOLLOCH WEIR
BY
Richards & Geier
ATTORNEYS

UNITED STATES PATENT OFFICE 2,272,451

REGULATING MEANS

Horace McColloch Weir, Philadelphia, Pa., assignor, by mesne assignments, to Maschinen- und Metallwaren-Handelsgesellschaft m. b. H., Berlin, Germany, a limited-liability company of Germany Application February 23, 1939, Serial No. 257,785
In Germany February 28, 1938

1 Claim. (Cl. 202—160)

This invention relates to improvements in distillation or refining processes, and refers more particularly to a method and means for regulating the amount of heat supplied to a distillation or rectification column.

In a distillation or rectification plant, it is customary to heat a portion of the distillation liquid removed from the bottom of the column until it forms a vapor which is returned into the column.

The head portion of the column usually contains a condenser wherein the distillation liquid is precipitated. A small part of the precipitated liquid is removed from the column, while the greater portion of the precipitated liquid flows back to the bottom of the column and is again brought into contact with the heated vapors of the distillation liquid. A part of the liquid reaching the bottom of the column is permanently removed therefrom, while another part, as already stated, is heated to form a vapor which is returned to the column.

The proper operation of the column depends primarily upon the maintenance of a constant pressure and temperature and the regulation of the supply of the raw product and of the removal of the liquid at the head and bottom of the column. When these requirements are complied with, the proper operation of the distillation column depends substantially solely upon the amount of liquid flowing from the head portion of the column back to the bottom thereof, i. e., from the so-called return flow ratio.

If predetermined amounts of the liquid are supplied to the column and are removed therefrom at the head and the bottom of the column, then a predetermined amount of heat is necessary for the heating of the liquid flowing through the column from the head to the bottom thereof, and this amount of heat should be sufficient to evaporate this "return flow" liquid.

In prior art the exact regulation of this amount of heat was very difficult, particularly since the columns are usually quite high and since there are small differences in temperature and pressure between the individual plates or filters of the column.

It is an object of the present invention to avoid these drawbacks and to provide a distillation and rectification plant wherein the amount of supplied heat can be easily and conveniently regulated.

Other objects of the present invention will be apparent in the course of the following specification.

The objects of the present invention may be realized by adapting the supplied amounts of heat to the particular requirements in the column through the provision of a regulatable heat exchanger wherein the liquid removed from the bottom of the column is brought in contact with indirect heat exchanging surfaces which are heated partly by steam, preferably under a high pressure, and partly by the condensate of that steam.

As is well known, steam contacting the same area as its condensate transmits much greater amounts of heat in equal periods of time than the condensate. By shifting the dividing line between a steam chamber and a condensed water chamber in the heat exchanger, i. e. by varying the amount of heat supplied by steam in relation to the amount of heat supplied by the condensate, the total amount of supplied heat per unit of time may be precisely and exactly regulated.

The invention will appear more clearly from the following detailed description when taken in connection with the accompanying drawing showing by way of example a preferred embodiment of the inventive idea.

In the drawing:

Figure 1 illustrates diagrammatically, partly in side elevation and partly in vertical section, a distillation plant constructed in accordance with the principles of the present invention, the column for convenience sake being drawn on a much smaller scale than the other parts of the plant.

Figure 2 is a section along the line 2—2 of Figure 1.

The plant shown in the drawing comprises a column 1 provided with a plurality of filter floors or plates 2 of the usual type. A pipe 3 is used for introducing the raw product which is to be distilled, substantially into the middle of the column 1.

The head 4 of the column 1 contains a condenser 5 which is cooled by any suitable means, for instance, by water circulating through the pipes 6 and 7. The liquid precipitated by the condenser 5 flows through the pipe 8 to a centrifuge 9 or any other suitable separating device. A pipe 10 is used for withdrawing a part of the liquid separated in the centrifuge 9 while the pipe 11 is used for returning the remaining portion of the liquid to the column 1.

A suitable regulating device 12 which may have the form of an overflow weir is situated close to the bottom 13 of the column and is connected with a pipe 14 through which the liquid 20 at the bottom of the column may be removed from circulation. The amount of the removed liquid may be regulated by impulse-steering means (not shown).

A part of the liquid which is collected at the bottom of the column 1 flows through a pipe 15 to a heating device 16 the interior of which contains vertical pipes 17.

The upper portion of the heat exchanger 16 is connected by the pipe 18 with the column 1, so that a fluid can pass from the pipes 17 back to the column 1.

The liquid 20 flowing from the column 1 into the heat exchanger 16 is heated therein by steam, which is introduced into the interior of the heat exchanger 16 under high pressure through the pipe 19. Condensed water 30 resulting from the heat exchange between the steam and the liquid 20 flows through the pipe 21 into a flow regulator 22 having the form of a cylinder provided with a bottom portion 23 carrying a stuffing box 24.

A pipe 25 projects into the interior of the cylinder 22 and is enclosed by the stuffing box 24, so that the cylinder 22 remains liquid-tight. The condensed water 30 may leave the cylinder 22 only through the pipe 25, and the position of the upper edges 26 of the pipe 25 determines the level of the condensed water 30 within the cylinder 22 and the heater 16.

The pipe 25 which is connected to a steam trap 25a, may be moved within the cylinder 22, whenever necessary, either manually or by any suitable mechanical means, for example, by a rack 28 attached to the pipe 25 and a ratchet wheel 29 driven by any suitable motor.

The device is operated as follows:

The circulation of the substance to be distilled is carried out in the customary manner.

Both liquid and vapor in intimate admixture pass into the column 1 through the pipe 18.

The heating of the substance which flows in the form of a liquid 20 from the bottom 13 of the column 1 through the pipe 15 and which is reintroduced in the form of a vapor into the column 1 through the pipe 18 is carried out in accordance with the following principles:

It is well known that the flowing heated steam gives up a much larger amount of heat to heat exchange surfaces per time and surface units than hot water. Therefore, the amount of heat supplied to the liquid 20 can be easily adjusted by varying the ratio of the heat exchange surfaces which are contacted by steam to the heat exchange surfaces which are contacted by the condensed water. Furthermore, this ratio is equal to the ratio between the heights of the steam chamber and the condensed water chamber in the heat exchanger 16, these heights being represented by the reference characters $h_D$ and $h_W$ in the drawing, so that the ratio is equal to $h_D : h_W$.

If the steam chamber, i. e., if $h_D$ is great, then considerable amounts of the liquid 20 will be evaporated within the container 16 and a large amount of liquid and vapor will flow through the pipe 18 into the column 1. On the other hand, if the steam chamber is small, that is, if $h_W$ is large, the amount of the evaporated liquid is small, so that only a small amount of the evaporated distillate flows through the pipe 18 into the column 1.

Thus, it is obvious that the return flow ratio with which the column 1 operates is primarily determined by the amount of supplied heat and secondarily by those imaginary surfaces which separate the steam chambers from the condensed water chambers in the heat exchanger 16.

The relative volumes of the steam chamber and the condensed water chamber may be conveniently adjusted by moving the pipe 25 within the cylinder 22.

The pipe 25 may be moved by hand, mechanically, or automatically.

Hand adjustment, for instance, by means of a hand wheel and a threaded rod (not shown) is advantageously employed when changes in the composition of the raw product supplied through the pipe 3 occur only at infrequent intervals and when it is possible to maintain the pressure, and consequently the temperature, of the heating steam substantially constant and when, furthermore, the compositions for the distillate and the residue product are not to be changed frequently.

On the other hand, if the operation of the plant is of a difficult or complicated nature, then the position of the pipe 25, and consequently the position of the surfaces separating the steam chambers from the water chambers, and the ratio $h_D : h_W$ may be changed automatically by the use of measuring instruments which respond to certain operative data in the column 1 and which transmit their impulses by any suitable means not shown in the drawing to the pipe 25. It is possible to cause the temperature or pressure at certain parts of the column 1 to influence measuring instruments situated therein which then cause movement of the pipe 25 in the described manner, or it is possible to utilize for that purpose the amount of the supplied liquid or of the withdrawn liquid or various physical or chemical properties of the fluids flowing to and from the column 1.

It is apparent that the specific illustrations shown above have been given by way of illustration and not by way of limitation, and that the structures above described are subject to wide variation and modification without departing from the scope or intent of the invention. For example, instead of causing the liquid 20 to flow through the inner pipes 17 of the heater 16 while steam flows around these pipes, the reverse procedure may be used, namely, steam may be caused to circulate through the inner pipes 17 and the liquid 20 may be caused to flow through the enclosing chambers. In general, any suitable heating device may be used for the same purposes. The regulating device 22 may be also differently constructed. All of these and other modifications and variations are to be included within the scope of the present invention.

What is claimed is:

A device for regulating heat supplied to a distillation or rectification column, said device comprising, in combination with the distillation or rectification column, a heat exchanger having at least two separate heat transmitting chambers in juxtaposition and heat exchange relationship with each other, means connected with said heat exchanger and with the bottom of said column for introducing a distillation liquid from the bottom of said column into one of said chambers, means connected with said heat exchanger and said column for removing vapors of said distillation liquid from that chamber and into said column, means connected with the top portion of said heat exchanger for introducing steam into the other chamber, a portion of the steam being condensed therein by heat exchange with said distillation liquid, a flow regulator casing, means connected with the bottom portion of said heat exchanger and said flow regulator casing for causing a flow of the condensate of said steam from said heat exchanger into said flow regulator casing, means connected with the top portion of said heat exchanger and said flow regulator casing to equalize steam pressures therein, a vertical pipe movable within said flow regulator casing for varying the level of the condensate of said steam in said flow regulator casing and said heat exchanger, said pipe precluding the passage of steam therethrough, and means connected with said pipe for moving the same to vary the effective heat exchange surface.

HORACE McCOLLOCH WEIR.